United States Patent [19]
Gulick

[11] Patent Number: 5,944,801
[45] Date of Patent: Aug. 31, 1999

[54] ISOCHRONOUS BUFFERS FOR MMX-EQUIPPED MICROPROCESSORS

[75] Inventor: Dale E. Gulick, Austin, Tex.

[73] Assignee: Advanced Micro Devices, Inc., Sunnyvale, Calif.

[21] Appl. No.: 08/906,328

[22] Filed: Aug. 5, 1997

[51] Int. Cl.[6] .................................................. G06F 13/00
[52] U.S. Cl. ............................... 710/29; 710/29; 710/58; 710/62; 710/130; 395/561
[58] Field of Search ..................................... 345/418, 156, 345/501, 507; 710/1, 5–7, 20–30, 52–68, 72–74, 100, 129–130; 395/561

[56] References Cited

U.S. PATENT DOCUMENTS

| | | | |
|---|---|---|---|
| 4,809,232 | 2/1989 | Baumbaugh et al. | 365/45 |
| 5,692,211 | 11/1997 | Gulick et al. | 395/800.35 |
| 5,732,224 | 3/1998 | Gulick et al. | 395/280 |
| 5,754,801 | 5/1998 | Lambrecht et al. | 395/308 |
| 5,784,592 | 7/1998 | Gulick et al. | 395/500 |
| 5,784,650 | 7/1998 | Gulick et al. | 395/882 |
| 5,809,342 | 9/1998 | Gulick | 395/884 |
| 5,818,948 | 10/1998 | Gulick | 381/77 |
| 5,832,242 | 11/1998 | Gulick | 395/308 |
| 5,870,622 | 2/1999 | Gulick et al. | 395/800.35 |

FOREIGN PATENT DOCUMENTS

| | | |
|---|---|---|
| 0644478A2 | 3/1995 | European Pat. Off. . |
| WO9201987 | 2/1992 | WIPO . |
| WO9312481 | 6/1993 | WIPO . |

*Primary Examiner*—Christopher B. Shin
*Attorney, Agent, or Firm*—Conley, Rose & Tayon, PC; B. Noel Kivlin

[57] ABSTRACT

A computer system includes a central processing unit directly coupled to a peripheral device. The peripheral device transmits and receives data from and to the central processing unit. An MMx unit within the CPU includes data buffers for storing data. Data from the multimedia device is stored in a receive buffer and subsequently retrieved by the MMx unit for processing. Data from the MMx unit is stored in a transmit buffer and subsequently retrieved by the multimedia device. The receive buffer may include a concatenator for combining data words received from the multimedia device into a multimedia data word. The transmit buffer may include a de-concatenator for dividing a multimedia data word into a plurality of data words for transmission to the multimedia device. The data buffers provide signals indicating the relative level of fullness or emptiness of the buffers. The signals are used to adjust the rate at which data is processed. In one embodiment, data is transferred to the multimedia device in a serial fashion. In this embodiment, a serial-to-parallel converter is coupled between the multimedia device in the receive buffer and a parallel-to-serial converter is coupled between the transmit buffer and the multimedia device.

19 Claims, 7 Drawing Sheets

ISOCHRONOUS BUFFERS FOR MMX-EQUIPPED MICROPROCESSORS

BACKGROUND OF THE INVENTION

1. Field of the Invention

The present invention relates generally to microprocessors and more particularly to transmission of isochronous data between a peripheral device and an MMx unit of a microprocessor.

2. Description of the Relevant Art

The continuing proliferation of computer development and applications has lead to computer systems that incorporate "multimedia" capability. That is, present computer technology allows for the processing of audio and video information as such information is generated by devices external to the central processing unit (CPU) or computer. For example, multimedia computers may present video images and/or audio tracks from a medium such as a CD-ROM.

Figure 1:
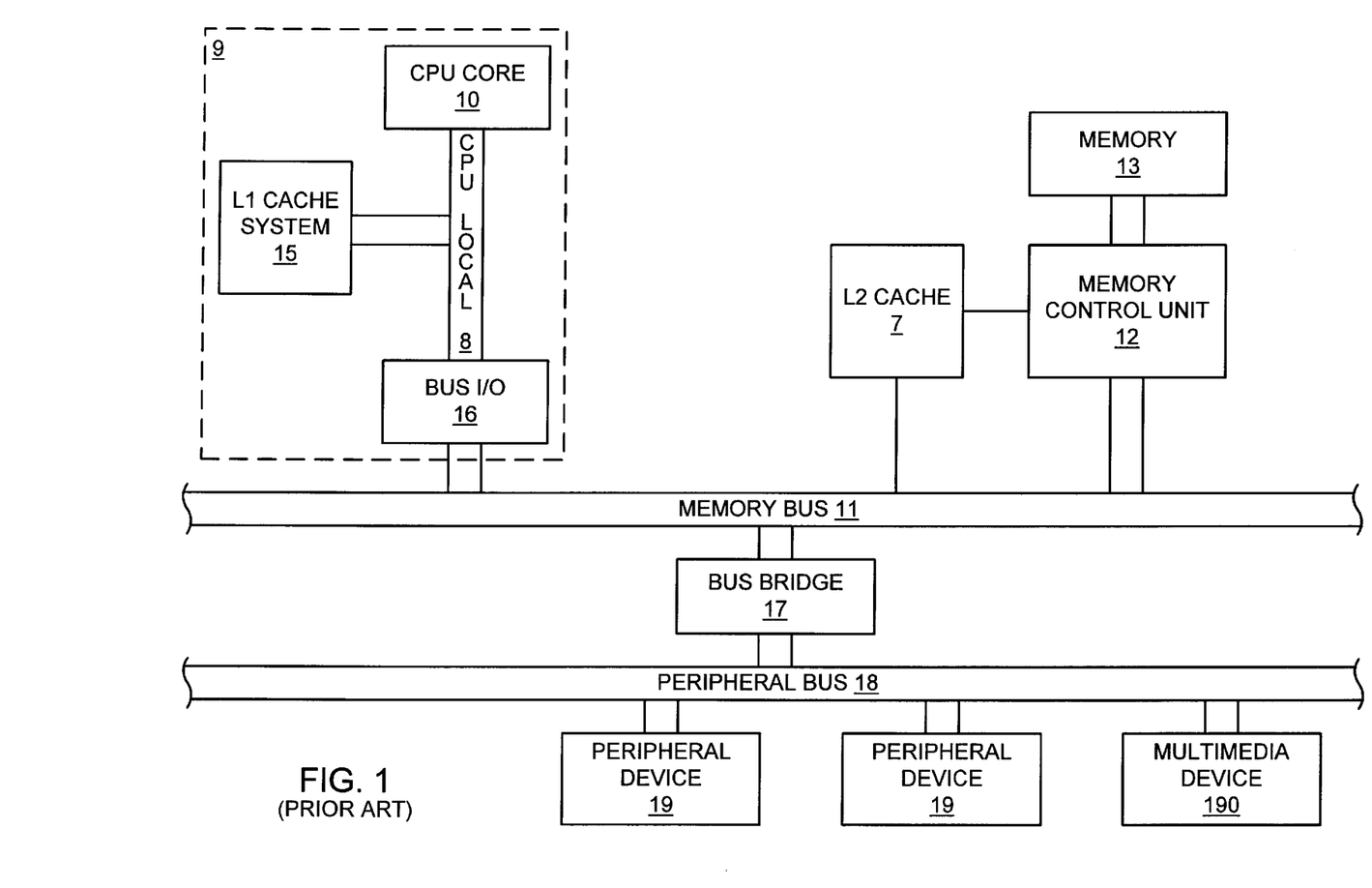
FIG. 1 is a block diagram representation of a typical prior art computer system.

FIG. 1 shows a typical prior art computer system depicting the elements relevant to the present discussion. A central processing unit (CPU) core 10 is coupled to an L1 cache system 15 and a bus input/output (I/O) device 16 over a CPU local bus 8. The L1 cache system 15 typically includes a cache controller and a cache SRAM (not shown). The CPU core 10, L1 cache system 15, and bus I/O 16 may be implemented as separate discrete components but preferably are integrated onto a single chip processor as indicated by dashed box 9.

The bus I/O device 16 couples the CPU local bus 8 to a memory bus 11. A memory control unit or memory controller 12 also couples to the memory bus 11. A second level cache, referred to as an L2 cache 7, couples to the memory bus 11 and also couples to the memory control unit 12. The memory control unit 12 couples to a memory device 13. The memory device 13 typically is dynamic random access memory (DRAM).

A bus bridge 17 couples the memory bus 11 to a peripheral bus 18. Peripheral devices 19 are coupled to the peripheral bus. A multimedia device 190 represents one type of peripheral device which is coupled to the peripheral bus 18. Examples of multimedia devices are CD-ROM drives, graphics cards, video recorders, sound cards, modems, and the like.

The CPU core 10 and peripheral devices 19 and 190 communicate through the bus bridge 17 in different ways. A simple communication scheme allows data from the CPU core 10 to be placed on the CPU local bus 11 and transferred through the bus I/O device 16, memory bus 11, bus bridge 17, peripheral bus 18, and to a peripheral device/multimedia device. Data communication from the peripheral devices 19 and 190 to the CPU core 10 follows the same path, albeit in the reverse order.

The CPU core 10 typically engages in multiple activities such as access cycles to the memory device 13 through memory control unit 12, accesses to the L1 cache SRAM 15, as well as receiving and transmitting data to a variety of peripheral devices 19/190. The CPU core 10 often performs digital signal processing (DSP) operations on video and audio data to and from the multimedia device 190. Digital signal processing is a time-consuming, iterative process often involving vast amounts of data and requiring a large portion of the CPU's computing resources. Multimedia data often comprises real-time, isochronous data (i.e., video and audio data metered out in regular time periods). For real-time data, such as video and audio, to be effectively observed by the human user, it must be performed (e.g., video data displayed on a monitor or sound data provided to speakers) at the same rate at which the data was acquired originally. Any delays in processing will render music or motion pictures, for example, unintelligible and useless. As such, multimedia data often requires processing by the CPU "on the fly" or "in real time."

These demands on the CPU's processing power often renders direct communication between a multimedia device 190 and the CPU core 10 impractical because the CPU generally can receive, transmit, and process data much faster than the multimedia device 190. Direct data transmission between CPU and multimedia device, consequently, may not be the most efficient transmission scheme in light of other processing demands on the CPU. Consequently, data from the multimedia device may be stored or buffered in the memory 13. Once in the memory, the CPU core 10 can retrieve the multimedia data more efficiently as larger blocks of data can be retrieved with less access overhead than with datum by datum transfers directly between multimedia device and CPU.

However, latency effects may render memory structures incapable of allowing real-time blocks of data to be stored, retrieved, and processed without detrimentally effecting the data's real-time nature. Further, latency in accessing DRAM often is unpredictable. For example, video data that is stored in the memory device 13 and periodically processed by the CPU core 10 with the latency inherent to the system may result in dropped frames or missed audio data, thereby resulting in jerky video and poor audio quality.

Buffering the multimedia data directly in the L1 cache system instead of main memory might be beneficial as cache memory accesses are faster and more efficient than accesses to system memory. However, directly buffering the multimedia data in the L1 cache system 15 and bypassing main memory storage may be impractical because cache memories cannot be used directly by peripheral devices to store data.

Therefore, it would be desirable to have a multimedia device capable of allowing real-time CPU processing of multimedia data while accomplishing other CPU-related tasks. Such a device would be able to effectively process and display video images and broadcast audio signals without losing the quality or usefuilness inherent to the information.

SUMMARY OF THE INVENTION

The problems outlined above are in large part solved by the present invention in which an multimedia unit ("MMx unit") within a microprocessor is equipped with data buffers for storing isochronous data received from peripheral devices. The data buffers store receive data from the peripheral devices and transmit data to be transferred to the peripheral devices. In one embodiment, the receive data is transferred to a multimedia receive register from which the MMx unit can access the data. In one embodiment, the MMx unit writes transmit data to a multimedia transmit register which is coupled to the transmit data buffer. In one particular embodiment, a concatenator is coupled between the received data buffer and the multimedia receive register. The concatenator concatenates data received from the peripheral device to form a multimedia data value. For example, the concatenator may concatenate four 16-bit data words received from a peripheral device into a 64-bit multimedia data value. Similarly, a de-concatenator may be coupled between the multimedia transmit register and the transmit data buffer.

The de-concatenator breaks a multimedia data value into data words to be output to a peripheral device.

A translate unit maps architected register addresses to physical registers. For example, the translate unit may map architecturally defined register MMO to the multimedia receive register. In this manner, multimedia instructions with MMO as a source operand may receive data directly from a peripheral device via the receive data buffer.

The receive and transmit data buffers additionally include signals that indicate a level of fullness or emptiness of the data buffer. The data level indication may be used by the central processing unit to adjust the rate of data processing to match the real time nature of the isochronous data streams.

Broadly speaking, the present invention contemplates a computer system including a peripheral device and a central processing unit that includes a multimedia unit. The peripheral device includes an data port configured to input transmit data and output receive data. The central processing unit is coupled to the data port of the peripheral device. The multimedia unit includes a receive buffer, a transmit buffer and a register file. The receive buffer is configured to input and store the receive data received from the peripheral device. The transmit buffer is configured to store the transmit data to be transferred to the peripheral device. The register file is coupled to the receive buffer and the transmit buffer. The register file includes a receive register configured to receive data from the receive buffer, and a transmit register configured to transfer the transmit data to the transmit buffer.

The present invention further contemplates a computer system comprising: a computer system including a peripheral device and a central processing unit that includes a multimedia unit. The peripheral device includes an data port configured to input transmit data and output receive data. The central processing unit is coupled to the data port of the peripheral device. The multimedia unit includes a receive buffer, a concatenator, a transmit buffer, a de-concatenator, and a register file. The receive buffer is configured to input and store the receive data received from the peripheral device. The concatenator is configured to concatenate the receive data. The transmit buffer is configured to store the transmit data to be transferred to the peripheral device. The de-concatenator is configured to de-concatenate the transmit data. The register file is coupled to the receive buffer and the transmit buffer. The register file includes a receive register configured to receive data from the receive buffer, and a transmit register configured to transfer the transmit data to the transmit buffer.

BRIEF DESCRIPTION OF THE DRAWINGS

Other objects and advantages of the present invention may become apparent upon reading the following detailed description and upon to reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 2:
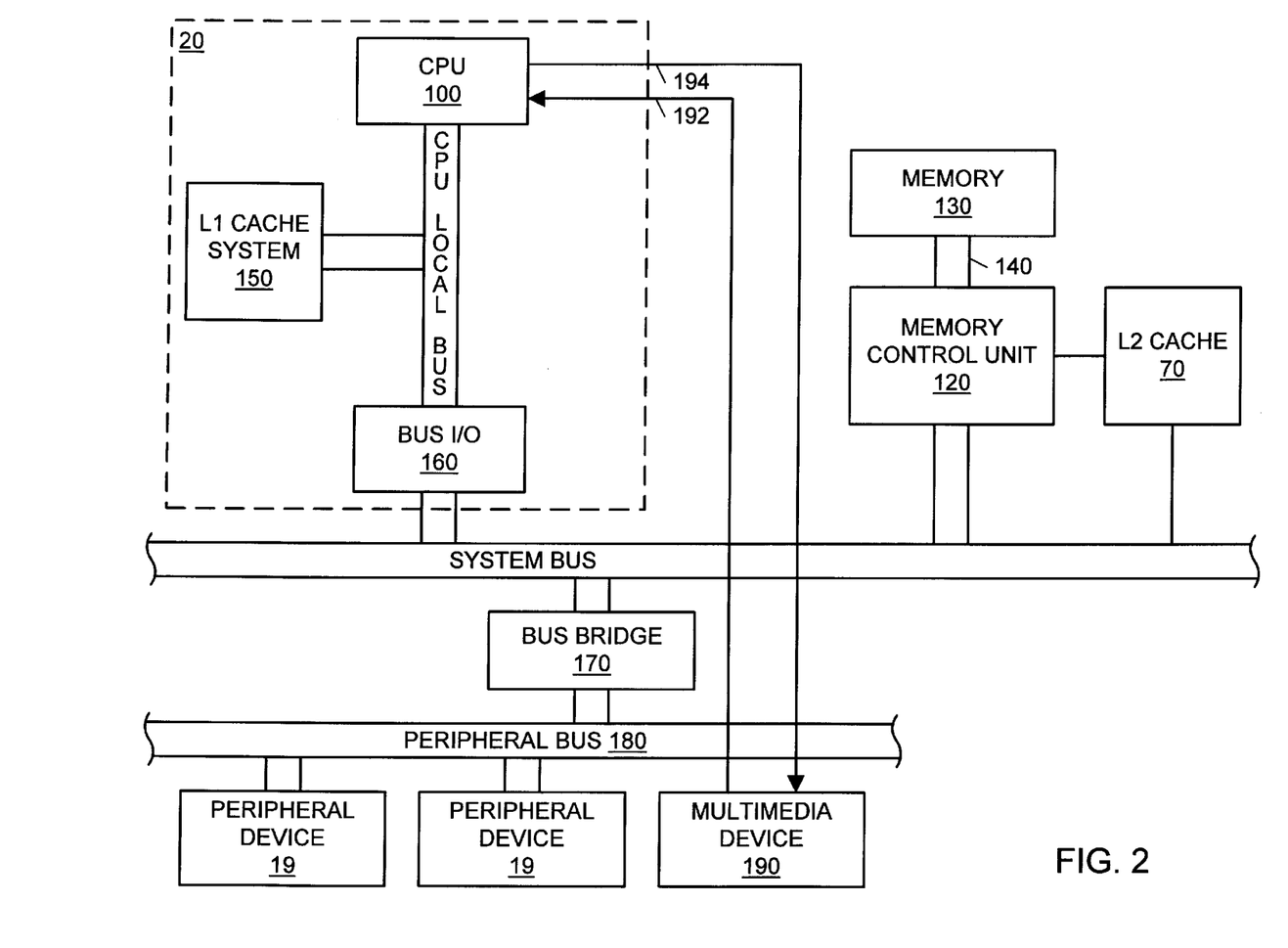
FIG. 2 is a block diagram representation of an improved computer system according to one embodiment of the present invention.

Referring now to FIG. 2, an improved computer system for transmitting data from a multimedia device to a multimedia unit that includes data stream buffers is shown. Components substantially the same are identical to components shown in FIG. 1 are given the same reference numerals for simplicity. A central processing unit (CPU) core 10 is coupled to an L1 cache system 15 and a bus I/O device 16 over a CPU local bus 8. Bus I/O 16 connects the CPU local bus 8 to a system bus or memory bus 11. A memory control unit 12 also couples to the system bus. Memory control unit 12 couples a memory device 13 which preferably includes random access memory (RAM). L2 cache 7 couples to memory controller 12 and system bus 11. A bus bridge 17 provides connectivity between system bus 11 and peripheral bus 18. External devices 19 are coupled to peripheral bus 18. Peripheral bus 18 preferably comprises a PCI (peripheral component interconnect) bus, but may comprise other bus types such as those complying with the ISA (industry standard architecture) and EISA (extended industry standard architecture) standards. Thus, peripheral bus 18 is not limited to any particular bus architecture.

Multimedia device 190 is coupled to CPU 10 via receive data bus 192 and transmit data bus 194. Multimedia device 190 may represent such media devices as graphic/video cards or systems, audio cards or systems, MPEG decoder/encoders, CD ROM systems, video cassette recorders, video cameras, and other similar devices. Data to be transmitted by multimedia device 190 to CPU 10 is transmitted via receive bus 192. Similarly, data to be received from CPU 10 is received via transmit bus 194. Details of the transmission and reception of data on buses 192 and 194 will be discussed in more detail below with the reference to FIGS. 4 and 5.

Figure 3:
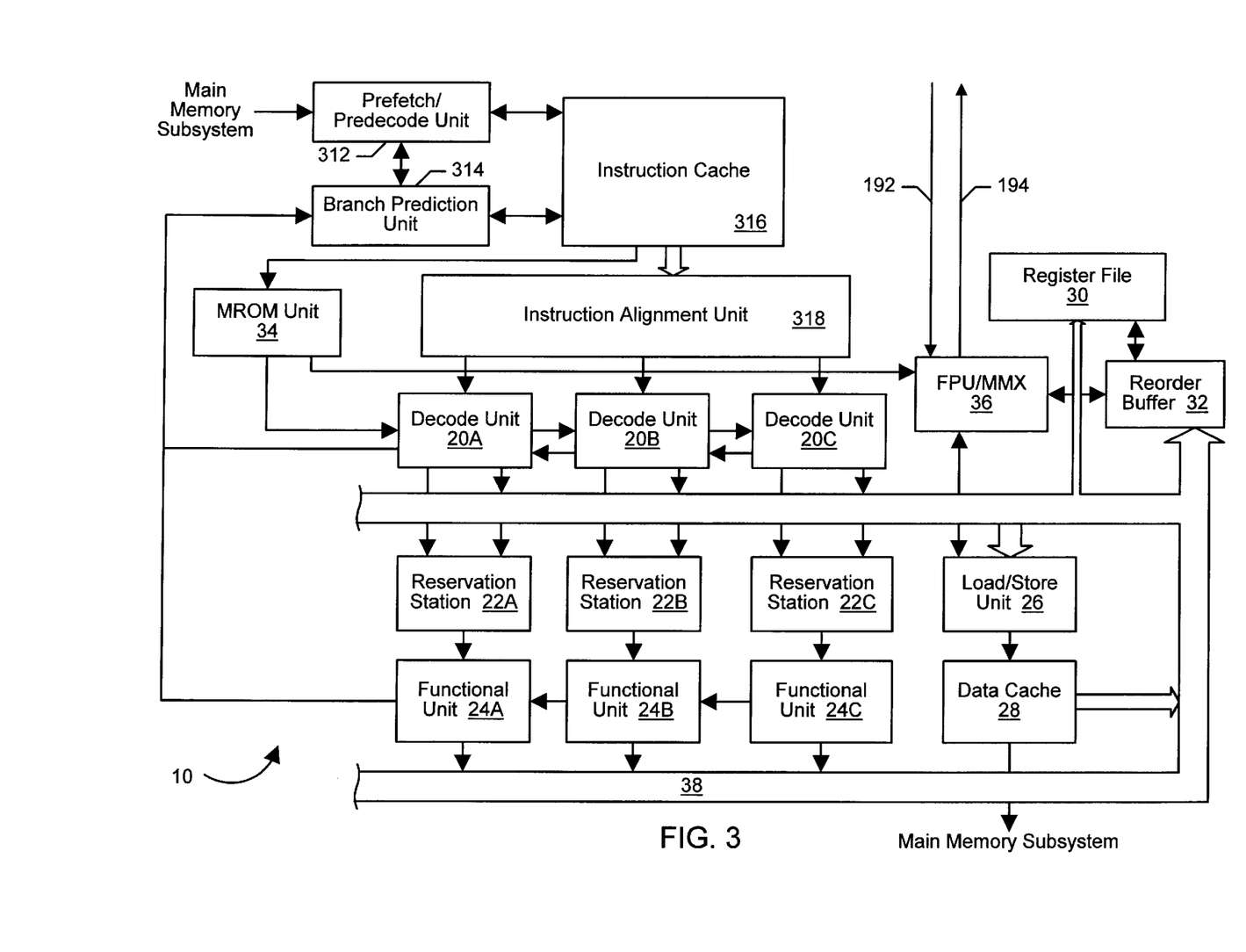
FIG. 3 is a block diagram representation of a microprocessor according to one embodiment of the present invention.

Turning now to FIG. 3, a block diagram of one embodiment of a microprocessor 10 is shown. Microprocessor 10 is shown for illustrative purposes only. The present invention contemplates any microprocessor design that includes a MMx unit.

Microprocessor 10 includes a prefetch/predecode unit 312, a branch prediction unit 314, an instruction cache 316, an instruction alignment unit 318, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point and multimedia unit (FPU/MMX) 36. Elements referred to herein with a particular reference number followed by a letter will be collectively referred to by the reference number alone. For example, decode units 20A–20C will be collectively referred to as decode units 20.

Prefetch/predecode unit 312 is coupled to receive instructions from a main memory subsystem (not shown), and is further coupled to instruction cache 316 and branch prediction unit 314. Similarly, branch prediction unit 314 is coupled to instruction cache 316. Still further, branch prediction unit 314 is coupled to decode units 20 and functional units 24. Instruction cache 316 is further coupled to MROM unit 34 and instruction alignment unit 318. Instruction alignment unit 318 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34 is coupled to decode units 20 and FPU/MMX 36. Finally, FPU/MMX 36 is coupled to load/store unit 26 and reorder buffer 32.

According to one embodiment of microprocessor 10, floating point instructions are classified as MROM (i.e. microcode) instructions for instruction fetching and dispatch purposes in instruction cache 316. Floating point instructions are routed to MROM unit 34. MROM unit 34 parses a floating point instruction into a floating point operation which is transmitted to FPU/MMX 36 and one or more load/store operations for load/store unit 26 to perform to retrieve memory operands for the instruction. As used herein, a "memory operand" of an instruction is an operand which is stored in a memory location (as opposed to a register within microprocessor 10). The memory operand is located via an address formed by adding one or more of the following: the contents of one or two registers, an immediate field of the instruction, and a displacement field of the instruction.

In a similar manner to floating point instructions, in one embodiment, multimedia instructions are classified as MROM instructions for instruction fetching and dispatch purposes. The multimedia instructions are routed to MROM unit 34 which parses the multimedia instruction into a multimedia operation which is transmitted to FPU/MMX 36 and one or more load/store operations for load/store unit 26 to perform.

In one embodiment, FPU/MMX unit 36 receives and executes both floating point and multimedia instructions. In one particular embodiment, the resources within FPU/MMX 36 are shared by both a floating point core and a multimedia core. Accordingly, FPU/MMX 36 contains one input buffer, one set of registers and one output buffer. The majority of the microprocessor handles multimedia instructions in the same manner as floating point instructions. As noted above, multimedia instructions are routed to MROM unit 34 which parses the multimedia instruction into a multimedia operation and one or more load/store operations.

Instruction cache 316 is a high speed cache memory provided to store instructions. Instructions are fetched from instruction cache 316 and dispatched to decode units 20. In one embodiment, instruction cache 316 is configured to store up to 32 kilobytes of instructions in a 4 way set associative structure having 32 byte lines (a byte comprises 8 binary bits). Instruction cache 316 may additionally employ a way prediction scheme in order to speed access times to the instruction cache. Instead of accessing tags identifying each line of instructions and comparing the tags to the fetch address to select a way, instruction cache 316 predicts the way that is accessed. In this manner, the way is selected prior to accessing the instruction storage. The access time of instruction cache 316 may be similar to a direct-mapped cache. A tag comparison is performed and, if the way prediction is incorrect, the correct instructions are fetched and the incorrect instructions are discarded. It is noted that instruction cache 316 may be implemented as a fully associative, set associative, or direct mapped configuration.

Instructions are fetched from main memory and stored into instruction cache 316 by prefetch/predecode unit 312. Instructions may be prefetched prior to the request thereof from instruction cache 316 in accordance with a prefetch scheme. A variety of prefetch schemes may be employed by prefetch/predecode unit 312. As prefetch/predecode unit 312 transfers instructions from main memory to instruction cache 316, prefetch/predecode unit 312 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 312 may be configured to detect branch instructions and to store branch prediction information corresponding to the branch instructions into branch prediction unit 314.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fastpath" instructions. The remaining x86 instructions are referred to as MROM instructions, according to one embodiment. For fastpath instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fastpath instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fastpath instruction including two prefix bytes, a Mod R/M byte, and an immediate byte would have start, end, and functional bits as follows:

Start bits 10000
End bits 00001
Functional bits 11000

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod RIM byte is set, then an SIB byte is present. Alternatively, if the functional bit for the Mod RIM byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fastpath instructions to effectuate the desired operation. If the MROM instruction is a floating point instruction, the fastpath instructions may include a floating point operation. MROM unit 34 dispatches the subset of fastpath instructions to decode units 20. A listing of exemplary x86 instructions categorized as fastpath instructions will be provided further below.

Microprocessor 10 employs branch prediction in order to speculatively fetch instructions subsequent to conditional branch instructions. Branch prediction unit 314 is included to perform branch prediction operations. In one embodiment, up to two branch target addresses are stored with respect to each 16 byte portion of each cache line in instruction cache 316. Prefetch/predecode unit 312 determines initial branch targets when a particular line is predecoded. Subsequent updates to the branch targets corresponding to a cache line may occur due to the execution of instructions within the cache line. Instruction cache 316 provides an indication of the instruction address being fetched, so that branch prediction unit 314 may determine which branch target addresses to select for forming a branch prediction. Decode units 20 and functional units 24 provide update information to branch prediction unit 314. Because branch prediction unit 314 stores two targets per 16 byte portion of the cache line, some branch instructions within the line may not be stored in branch prediction unit 314. Decode units 20 detect branch instructions which were not predicted by branch prediction unit 314. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 314.

Instructions fetched from instruction cache 316 are conveyed to instruction alignment unit 318. As instructions are fetched from instruction cache 316, the corresponding predecode data is scanned to provide information to instruction alignment unit 318 (and to MROM unit 34) regarding the instructions being fetched. Instruction alignment unit 318 utilizes the scanning data to align an instruction to each of decode units 20. In one embodiment, instruction alignment unit 318 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 318. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not is completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 314. If a branch prediction was incorrect, branch prediction unit 314 flushes instructions subsequent to the mispredicted branch that have entered the instruction processing pipeline, and causes fetch of the required instructions from instruction cache 316 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 316, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 316 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 4:
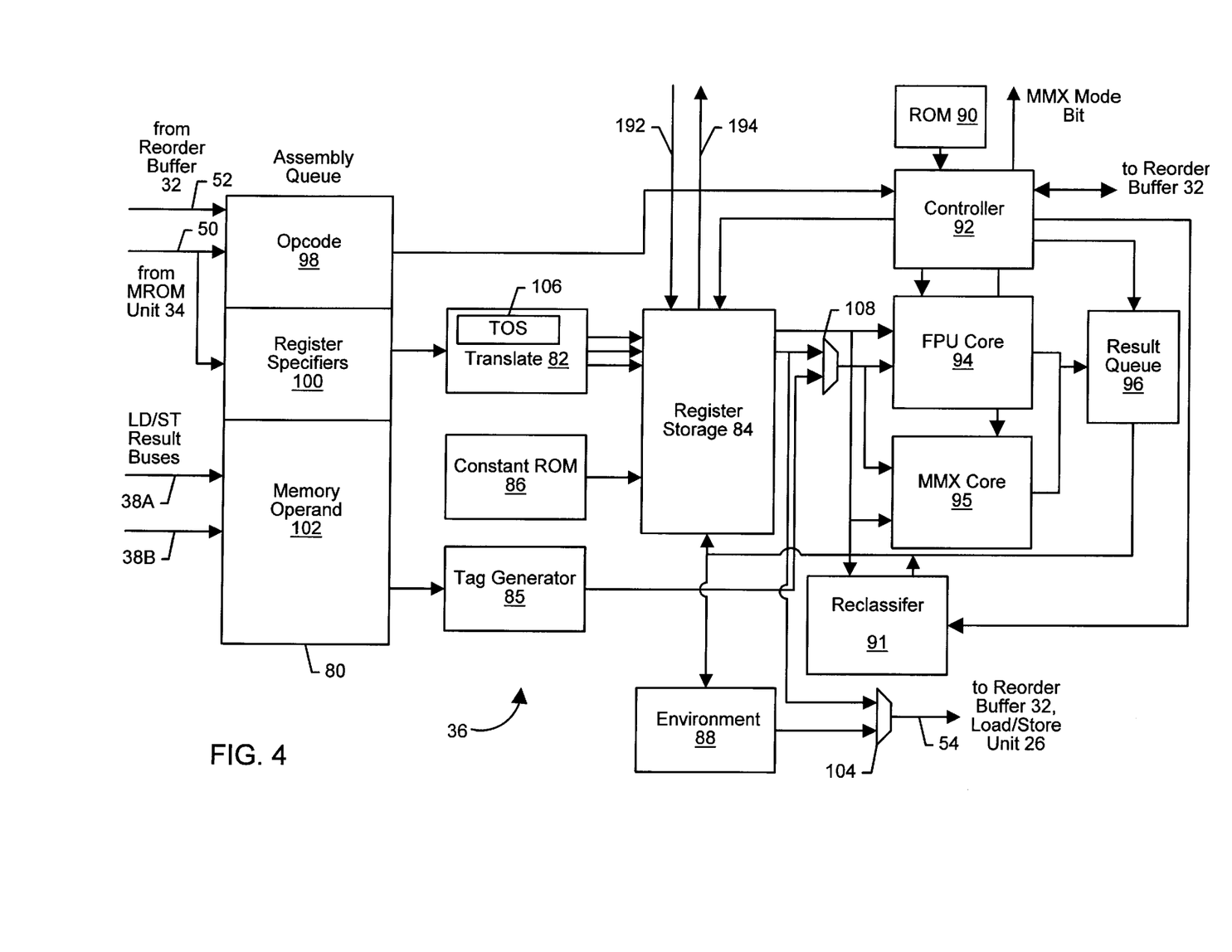
FIG. 4 is a block diagram representation of a floating point and multimedia unit according to one embodiment of the present invention.

Turning next to FIG. 4, a block diagram of one embodiment of FPU/MMX 36 is shown. As shown in FIG. 4, FPU/MMX 36 includes an assembly queue 80, a translate unit 82, a register storage 84, a tag generator 85, a constant read-only memory (ROM) 86, an environment unit 88, an ROM 90, a reclassifier 91, controller 92, an FPU core 94, an MMX core 95 and a result queue 96. In the illustrated embodiment, FPU/MMX 36 handles both floating point and multimedia instructions. FPU core 94 and MMX core 95 share the same resources, such as, register storage 84, controller 92 and result queue 96.

Assembly queue 80 comprises multiple queue entries, each of which is configured to store instruction information corresponding to one instruction. As shown in FIG. 4, assembly queue 80 includes several fields for each entry. An opcode field 98 is included for storing the opcode of an instruction and the corresponding reorder buffer tag and a stack specifiers field 100 is included for storing register specifiers which select storage locations within register storage 84. The selected registers provide operands for the corresponding instructions. The values stored in opcode field 98 and stack specifier field 100 are received by FPU/MMX 36 upon float/MMX operation bus 50 from MROM unit 34 and tag bus 52 from reorder buffer 32. Assembly queue 80 further includes a memory operand queue 102 for storing a memory operand used by the instruction. The memory operand is received upon load/store result buses 38A and 38B.

Assembly queue 80 is coupled to controller 92, to translate unit 82, and to tag generator 85. Translate unit 82 is coupled to register storage 84, which is further coupled to constant ROM 86, result queue 96, FPU core 94, MMX core 95 and reclassifier 91. Environment 88 is coupled to result queue 96 and is coupled to provide, through multiplexor 104, a result upon FPU/MMX result bus 54. Register storage 84 may also provide a result upon FPU/MMX result bus 54 through multiplexor 104. Controller 92 is coupled to ROM 90, result queue 96, reclassifier 91, MMX core 95 and FPU core 94. FPU core 94 and MMX core 95 are further coupled to result queue 96. Reclassifier 91 is coupled to an output and an input of register storage 84. Control 92 is further coupled to receive the signals forming the interface between FPU/MMX 36 and reorder buffer 32 (e.g. the signals upon conductors 52, 56, 58, 60, 62, 64, 66, 68, and 70).

Generally speaking, instructions and their corresponding memory operands are received into assembly queue 80. Instructions are dispatched from assembly queue 80 into the execution pipeline of FPU/MMX 36. FPU instructions are executed by FPU core 94, and MMX instructions are executed by MMX core 95. Upon exit from the execution pipeline, the results of the instructions are stored into result queue 96. The results are held in result queue 96 until a retire indication is received from reorder buffer 32. Upon receipt of the retire indication, the results are stored into register storage 84 (or FPU environment 88, if the destination of the instruction is an FPU environment register such as the control word or the status word).

Translate unit 82 provides the translated register specifiers to register storage 84, which reads the values from the corresponding register locations and provides the register values and the associated tag values to FPU core 94 or MMX core 95. Register storage 84 includes the architected FPU/MMX registers defined by the microprocessor architecture employed by microprocessor 10. For example, embodiments of microprocessor 10 employing the x86 microprocessor architecture may include eight architected floating point registers and eight architected multimedia registers (MM0–MM7) within register storage 84. Alternatively, eight architected registers may serve as both floating point registers and multimedia registers. Additionally, register storage 84 may include temporary registers for use by microcode routines stored in ROM 90, as described below. In one embodiment, 24 temporary registers are included.

Register storage 84 may include a register field 87 and a tag field 89. Register field 87 contains a plurality of registers. Each register is configured to store a plurality of bits referred to as a register value. Tag field 89 is configured to store a plurality of tag values. Each tag value in tag field 89 is associated with a register value in register field 87. In one embodiment, each tag value contains a valid bit and a plurality of type bits. The valid bit of the tag value indicates whether the register associated with the valid bit contains a valid register value. The valid bit may be used to configure register storage 84 as a register stack. As a register value is pushed on the stack, the valid bit of the register to which the register value is pushed is asserted. Similarly, when a register value is popped from the stack, the valid bit associated with the register from which the register value is popped is deasserted indicating that the register is empty, or does not contain a valid register value. If a register with a deasserted valid bit is attempted to be accessed, an underflow or overflow stack exception is generated. In an alternative embodiment, register storage 84 is configured as a register file. In this embodiment, the valid bits may all be asserted, which indicates that each register contains valid data. In this embodiment, instructions may read the data from any register without overflow or underflow stack exceptions. Register storage 84 is also coupled to receive bus 192 and transmit bus 194.

The type bits, or type field, identify particular bit combinations of a register value. In one embodiment, the type bits include a plurality of floating point types and one multimedia type. For example, the type bits may identify whether the register value contains a bit pattern that represents a floating point zero, a floating point infinity, an illegal or invalid floating point type, a normal floating point type or a multimedia type. As noted above, zero, infinity and invalid are types of special floating point numbers. The type bits may be used by the floating point core or the multimedia core to identify characteristics of a register value. For example, special rules exist within the floating point core for multiplication and division involving a floating point zero. Although the floating point core could detect whether an operand is a floating point zero by decoding the bits of the operand, the floating point core may rely upon the type bits to identify the operand as a floating point zero. Relying on the type field eliminates the step of decoding the register value each time it is used. If a floating point operation is performed on a register value that represents a floating point zero but is not properly marked as a floating point zero, unpredictable results may occur. Accordingly, it is necessary when performing floating point operations that the type field properly interprets the bit pattern stored in register field 87 as a floating point data.

The x86 architecture defines a floating point tag word to identify the contents of the eight architectural floating point registers. The tag word includes a two-bit tag for each register. The tag word identifies whether each register is valid, zero, special or empty. In one embodiment, the tag word is derived from information stored in tag field 89. In this embodiment, the tag word is not a separate physical entity. When the tag word is read, data from tag field 89 is decoded to yield the necessary information. If the valid bit of a register is deasserted, the tag word indicates that the register is empty. If the valid bit is asserted, the type field identifies whether the tag word is valid, zero or special. If the type field indicates a floating point zero, the tag word identifies zero. If the type fields indicate a floating point special other than zero, the tag word identifies special. If the type field identifies normal or multimedia type, the tag word identifies valid.

As discussed above, one type identified by the type field is a multimedia type. The multimedia type may identify multimedia operands loaded from memory and results of multimedia operations store in the register file. In one embodiment, two different load instructions are defined: a floating point load and a multimedia load. Memory operands loaded using a floating point load are typed as a floating point number by tag generator 85. For example, tag generator 85 may decode the memory operand to determine whether the operand is zero, infinity, NaN, invalid, or a normal floating point number. In contrast, an operand loaded using a multimedia load operation is typed by tag generator 85 as multimedia type. Similarly, results of floating point instructions are typed as floating numbers (either normal or one of the special floating point numbers), and results of multimedia instructions are typed as multimedia numbers. In one embodiment only one multimedia type is defined. In other embodiments, a plurality of multimedia types may be defined. In this embodiment, tag generator 85 may classify the memory operand as one of the multimedia types.

As noted above, in one embodiment, register storage 84 may be configured as a register stack when executing floating point instructions. Accordingly, certain instructions are defined to push a value onto or pop a value from the stack. Pushing a value onto the stack comprises storing the value into a register adjacent to the register which is currently the top of the stack and making that adjacent register the top of the stack. Popping a value from the stack comprises reading the value from the register which is currently the top of the stack and making the stack pointer indicate an adjacent register. Most of the floating point instructions use stack-relative register specifiers (i.e. the specifier indicates the register which is the top of the stack or the register which is at a particular offset from the top of the stack). Therefore, the register specifier is somewhat dependent upon the instructions which execute prior to that instruction (since these instructions may affect which register is the top of the stack). Translate unit 82 maps the stack specifiers to the registers within register storage 84 based upon a speculative top of stack value which reflects execution of the instructions prior to a particular instruction in program order (including the instructions still within the execution pipeline of FPU/MMX 36). A top of stack (TOS) register 106 is included for storing the top of stack indicator. Additionally, a table is provided within translate unit 82 for mapping each register to its stack relative position. Registers may become out of order in the stack due to an exchange instruction which exchanges the contents of a pair of registers. Such an instruction may be implemented by swapping their addresses within the table instead of physically swapping the contents of the corresponding registers. In an alternative embodiment, register storage 84 is configured as a register file. In this embodiment, translate 82 decodes the register specifier to address one of the registers within register storage 84.

The memory operand for an instruction may be substituted for one of the operands from register storage 84 via multiplexor 108. Memory operand field 102 stores memory operands for floating point and multimedia instructions. Memory operands are received from load/store result buses 38A and 38B. In one embodiment, memory operands are conveyed to tag generator 85. Tag generator 85 generates a tag value for the memory operand. The tag value, similar to the tag value discussed above in reference to register storage 84, may indicate whether the memory operand is a normal floating point number, a special floating point number, or a multimedia number. A memory operand is conveyed to tag generator 85 when the instruction corresponding to the memory operand is dispatched into the execution pipeline. The memory operand and the tag value associated with the memory operand are conveyed to FPU core 94 or MMX core 95 via multiplexor 108. In one embodiment, tag generator 85 generates the tag value in parallel with translate unit 82 translating the register specifiers.

FPU core 94 includes the hardware used to manipulate the source operands of the floating point instruction in order to produce the result of the instruction. For example, FPU core 94 includes a multiplier for multiplying the input operands, an adder for adding the input operands, etc. FPU core 94 routes the operands to the various pieces of hardware in response to control signals from controller 92. Certain floating point instructions may not use any of the hardware at a particular stage of the execution pipeline. These instructions are routed around the particular stage, so as to exit the execution pipeline more rapidly.

MMX core 95 includes the hardware used to manipulate the source operands of a multimedia instruction in order to produce the result of the instruction. For example, MMX core 95 may include shift logic for shifting input operands, comparison logic for comparing input operands, etc. MMX core 95 routes the operands to various pieces of hardware in response to control signals from controller 92. Controller 92 receives the opcode for a given instruction from assembly queue 80 and routes the instruction to the MMX core execution pipeline accordingly. Certain instructions may not use any of the hardware at a particular stage of the execution pipeline. These instructions are routed around the particular stage, so as to exit the MMX core execution pipeline more rapidly.

Controller 92 receives the opcode for a given instruction from assembly queue 80. If the instruction is a floating point instruction, controller 92 routes the instruction to FPU core 94 and through the execution pipeline accordingly. If the instruction is a multimedia instruction, controller 92 routes the instruction to MMX core 95. Additionally, controller 92 handles the interface to reorder buffer 32 and communicates with other elements of FPU/MMX 36 according to communications upon the interface. For example, when a particular instruction receives a retire indication, controller 92 communicates with result queue 96 to cause the corresponding instruction result to be stored into register storage 84. If the instruction has not yet been completed, result queue 96 queues the retire indication until the instruction is completed.

Floating point instructions are classified by FPU/MMX 36 into one of two types, according to the present embodiment. The first type (referred to herein as "basic") includes instructions which provide a basic arithmetic operation (such as multiply, add, etc.) or a data movement instruction. Generally, the basic instructions can be completed with one pass through the execution pipeline. On the other hand, the second type (referred to herein as "transcendental") includes instructions which perform a more abstract mathematical function. For example, the transcendental instructions may include the sine and cosine functions, as well as functions such as logarithm and square root. The transcendental functions are implemented using microcoded routines stored in ROM 90. Effectively, the transcendental instructions make multiple passes through the execution pipeline in order to complete. Intermediate results are calculated by the instructions within the microcoded routine, and the final result is formed by calculating upon the intermediate results.

In the embodiment illustrated in FIG. 4, FPU core 94 and MMX core 95 share one set of registers. In this embodiment, problems may occur if floating point instructions use operands that are identified as multimedia type. As discussed above, FPU core 94 may rely on the type field associated with a register to identify special floating point numbers such as zero and infinity. A register may contain a multimedia register value with the same bit representation as a special floating point number. The type field of the multimedia register value, however, may identify the register value as a multimedia type. If FPU core 94 attempts to perform a floating point operation using that register value, unpredictable results may occur because the tag field fails to identify the bit pattern as a special floating point number. The above described anomaly may occur when floating point instructions are executed subsequent to multimedia instructions. In an attempt to prevent anomalous results, an instruction is defined to empty the multimedia state prior to executing floating point instructions. This instruction is called EMMS.

The EMMS instruction deasserts the valid bits of all registers within register storage 84. The effect of the EMMS instruction is to empty the register file. Although the instruction does not affect the contents of register storage 84, the registers are all marked, or tagged, as empty. Any subsequent floating point instruction except a load instruction, a save state instruction, a restore state instruction, a store environment instruction or a load environment instruction will cause an underflow stack exception. All floating point operands must be loaded after the EMMS instruction and those operands are properly tagged as floating point types by tag generator 85. Accordingly, if the EMMS instruction is executed subsequent to a multimedia instruction and prior to a floating point instruction, the anomalous results discussed above may be avoided.

The microcoded routines may make use of a set of constants stored in constant ROM 86. The constants stored in constant ROM 86 are useful in calculating results for the transcendental instructions. Additionally, the constants may be useful in calculating the results of operations with special floating point numbers as operands. For example, the floating point representations of 1, 0, −1, Pi, etc., as well as constants particular to the microcoded routines may be stored in constant ROM 86. The constants may be loaded into temporary registers for use by the microcoded routines. According to one embodiment, constant ROM 86 stores 128 double precision constants and 64 single precision constants.

Environment 88 stores control and status information regarding the state of FPU/MMX 36. A control word may be stored which indicates the rounding and precision modes of FPU/MMX 36 as well as a mask for various exceptions. A status word may also be stored which indicates which exceptions have been detected, the top of stack pointer, etc.

According to one particular embodiment, FPU/MMX 36 executes instructions in program order. The instructions are received into assembly queue 80 in program order, and are provided into the execution pipeline of FPU/MMX 36 in program order as well. An instruction may be ready for execution within assembly queue 80 (i.e. all operands provided) but may remain stored therein because another instruction prior the instruction in program order is not ready for execution. In other words, assembly queue 80 operates as a first-in, first-out (FIFO) buffer. Similarly, results are stored from result queue 96 into register storage 84 and/or environment 88 in program order.

Figure 5:
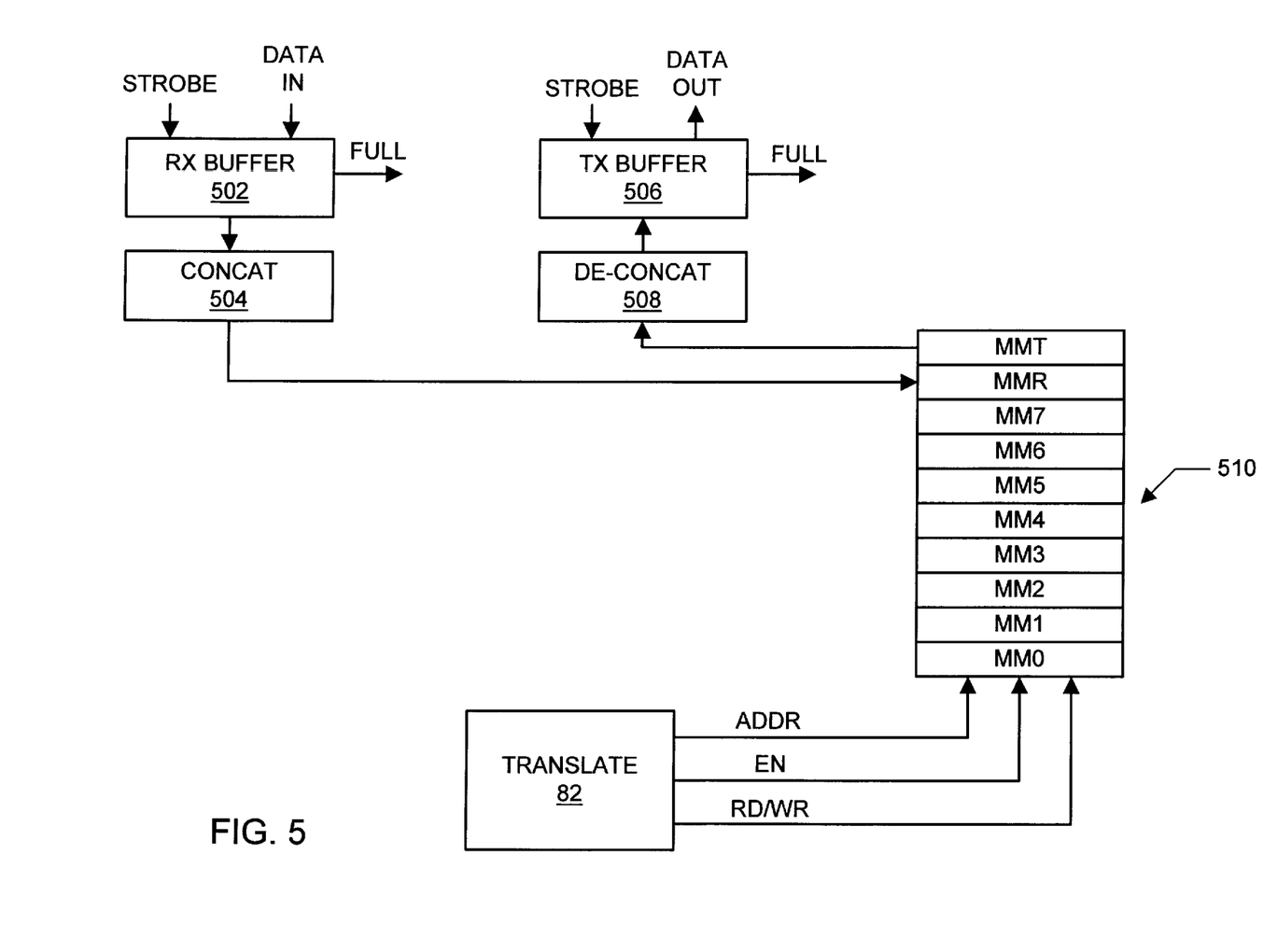
FIG. 5 is a block diagram representation of a translate unit and a register storage device according to one embodiment of the present invention.

Turning now to FIG. 5, a block diagram illustrating one embodiment of a translate unit 82 and register storage 84 is shown. Register storage 84 includes a receive buffer 502, a concatenator 504, a transmit buffer 506, a de-concatenator 508, and a register file 510. Receive buffer 502 is coupled to concatenator 504 which is coupled to register file 510. Register file 510 is coupled to de-concatenator 508 which is coupled to transmit buffer 506. Translate unit 82 is coupled to register file 510.

Generally speaking, receive data received from a peripheral device, such as multimedia device 190, is stored in receive buffer 502. Concatenator 504 may combine a plurality of data words stored in receive buffer 502 to yield a multimedia data value of a predetermined length. The data value from concatenator 502 may be stored in register file 510. In a similar manner, transmit data stored in register file 510 is conveyed to de-concatenator 508. De-concatenator 508 separates the multimedia data value into data words of a predefined length to be stored in transmit buffer 506. Data buffer 506 stores the transmit data until the data is read by a peripheral device. Translate 82 provides control signals to access register file 510. Translate unit 82 may map the receive and transmit buffers to replace defined registers within register file 510.

Receive buffer 502 is a conventional storage device for storing data. In a preferred embodiment, receive buffer 502 is organized as a first-in-first-out (FIFO) buffer. In one embodiment, receive buffer 502 receives a data-in and a strobe signal on receive bus 192. When valid receive data is available on the data-in line, the strobe signal is transitioned from a high state to a low state or a low state to a high state. The strobe signal causes receive buffer 502 to store the data on the data-in signal. The data received on the data-in signal is stored by receive buffer 502 until the data is output to register file 510. In an alternative embodiment, receive buffer 502 may receive data asynchronously or isochronously.

The data received on the data-in signal may be of a different width than the data stored in register file 510. For example, the data received on the data-in signal may be 16 bits wide while register file 510 stores 64-bit data words. In one embodiment, concatenator 504 is configured to join or concatenate the data stored in receive buffer 502 prior to conveying the data to register file 510. For example, concatenator 504 may join four 16-bit words from receive buffer 502 to form a 64-bit word which is stored to register file 510. In an alternative embodiment, concatenator 504 is eliminated and data is conveyed directly from receive buffer 502 to register file 510.

Register file 510 includes a plurality of registers. In one embodiment, register file 510 includes eight architected registers referred to as MM0–MM7. For the purposes of this disclosure, an architected register is a register defined in the microprocessor architecture that is addressable by a programmer. In one particular embodiment, register file 510 additionally includes a multimedia receive register (MMR) and a multimedia transmit register (MMT). The MMR register receives data from concatenator 504. In one embodiment, MMR stores a multimedia data word for access by MMx core 95. When MMx core 95 reads an MMx data value from MMR, another data word is stored into MMR from received buffer 502. In the illustrated embodiment, transmit data to be transferred to a peripheral device is stored in MMT by MMx core 95 or another device that prepares multimedia data for transmission to a peripheral device. In one embodiment, de-concatenator 508 divides the multimedia data value read from the MMT into a plurality of transmit data words and stores those data words in transmit buffer 506. Transmit buffer 506 stores the transmit data words until a peripheral device reads the data via a data-out signal. A strobe input to transmission buffer 506 may cause transmission buffer 506 to output a data word on the data-out signal. The data-out signal and strobe signal may be transmitted and received on a transmit bus 194.

Translate unit 82 provides control signals to register file 510 to input or output data to/from one of the registers within the register file. Translate unit 82 may map MMR or MMT to replace one of the architected multimedia registers. For example, MMR may be mapped to replace MM4. When an instruction uses MM4 as a source register, the data from MMR is used rather than the data from MM4. Similarly, MMT may be mapped to an architected register. When the architected register replaced by MMT is identified as a destination register by a multimedia instruction, the data is written to MMT rather than the architected register. Translate unit 82 may provide an address signal, an enable signal and a read/write signal to register file 510. The address signal identifies which register within register file 510 to access. The read/write signal indicates whether data is being read from register file 510 or data is being written to register file 510. The enable signal enables the read or write from the register specified by the address signal.

As discussed above, in one embodiment, translate unit 82 may map architected registers to MMT and/or MMR. When translate unit 82 receives register specifiers from assembly queue 80, translate unit 82 determine which register within register file 510 that register specifier is mapped to. For example, MM4 may be mapped to MMR. Accordingly, when translate unit 82 receives a register specifier specifying MM4, translate unit 82 outputs the address of MMR on the address signal rather than the address of MM4. In this manner, data from a peripheral device may be accessed by the MMx core in the same manner as register values are accessed.

Multimedia devices typically have real time processing requirements and data rates. This is generally not true for other tasks handled by the CPU. Processing rates also vary among different multimedia devices. Differences in these real time dependencies may make data communication problematic. For example, data in the transmit data buffer may be overwritten if the CPU stores data in the buffer faster than the multimedia device can retrieve it. Thus, in one embodiment the processor is programmed with the isochronous rate of multimedia device 190. Synchronizing processing rates between CPU 10 and multimedia device 190 effectively enables data to be written into a data buffer at the same rate the data is retrieved. Thus, valid data in the buffer will not be overwritten. This approach, however, places generally unacceptable limitations on the operating system and is further limited because the data rate may change for a multimedia device during different modes of operation and, certainly, different multimedia devices have different data rates. Accordingly, the preferred embodiment includes several ways to overcome this problem including the use of interrupt signals or level signals to adjust in real time the effective rate of the CPU or to adjust the clock rate of the data producing or data consuming devices.

An embodiment including interrupt signals is now described. Receive buffer 502 and transmit buffer 506 may contain logic to generate interrupt signals which are either received by the system interrupt controller or provided to a pin, such as an NMI pin of a processing core. The interrupt indicates a relative level of fullness or emptiness of the buffer. For example, the interrupt signal may indicate the data buffer is half full of data, that the buffer is completely full, or that the buffer contains a predetermined number of memory locations containing valid data. This predetermined number of locations may be programmable or fixed. One or more interrupt signals may be used in a given implementation. For example, the system designer may desire to implement an interrupt signal to trigger the processor core or MMx unit to retrieve data from receive buffer 502 via MMR once the buffer becomes half full of data from the peripheral device. The data can be retrieved and processed while the buffer is filling up with new data. Alternatively, on the transmit side, an interrupt signal may be implemented to indicate to the processor core or MMX unit that the peripheral device has retrieved all but one memory position, thereby signaling the processor core or MMX unit to store new data in transmit buffer 506. Factors such as the data rate, type of data, and processing power of the CPU relative to the peripheral device influences the designer's choice of interrupt protocol.

In an alternative embodiment, received buffer 502 and/or transmit buffer 502 outputs a signal indicative of the relative fullness or emptiness of the buffer. For example, the data buffers may output a signal indicating the number of memory locations storing valid data. Alternatively, the data buffers may output a signal indicating the percentage of the total buffer space free for the receipt of data from either register file 510 or a peripheral device. In either case, the signal provides a way for the processor core or MMX unit to infer how full the buffer has become so that the processor core can adjust the effective data rate of writing to or reading from the buffer. For example, if it is desired for the MMx unit to retrieve data from receive buffer 502 so that the buffer never becomes more than 50% full and the signal indicates that the buffer is 70% full, MMx unit may increase the data retrieval rate from receive buffer 502. A faster effective rate can be achieved by reading data from MMR more often. Alternatively, if the buffer is only 5% full, it may be desired for the MMx unit to slow down its effective retrieval rate to let the peripheral device fill the buffer faster than data is retrieved. Slower effective retrieval rates may be achieved by reading MMR less often.

In an alternative embodiment, the effect data rate of the multimedia device is adjusted based upon the level or interrupt signals instead of the effective data rate of the CPU. For example, if the MMR is fuller than desired, the effective data rate of the multimedia device may be reduced thereby reducing the amount of data transferred to the MMR. If the effective data rate of the CPU remains unchanged, reducing the data rate of the multimedia device will have the effect of reducing the level of fullness of the MMR.

In a similar manner to that discussed above with reference to receive buffer 502, transmit buffer 506 may output a signal indicating the relative level of emptiness of transmit buffer 506. The multimedia unit writes data to MMT and transmit buffer 506 at a nominal rate approximating the isochronous rate of the multimedia device. To prevent the multimedia device from overwriting data in the transmit buffer when the peripheral device does not retrieve data as fast as the multimedia unit stores data to the transmit buffer, the transmit buffer periodically checks the signal output by transmit buffer 506 indicating a level of emptiness of the buffer. If, for example, the signal indicates that transmit buffer 506 is almost full, the MMx unit can use that information to slow down its effective rate of storing data in the buffer. Alternatively, if the signal indicates the transmit buffer 506 Is almost empty, the MMx unit can increase the effective rate of storing data to the buffer.

Figure 6:
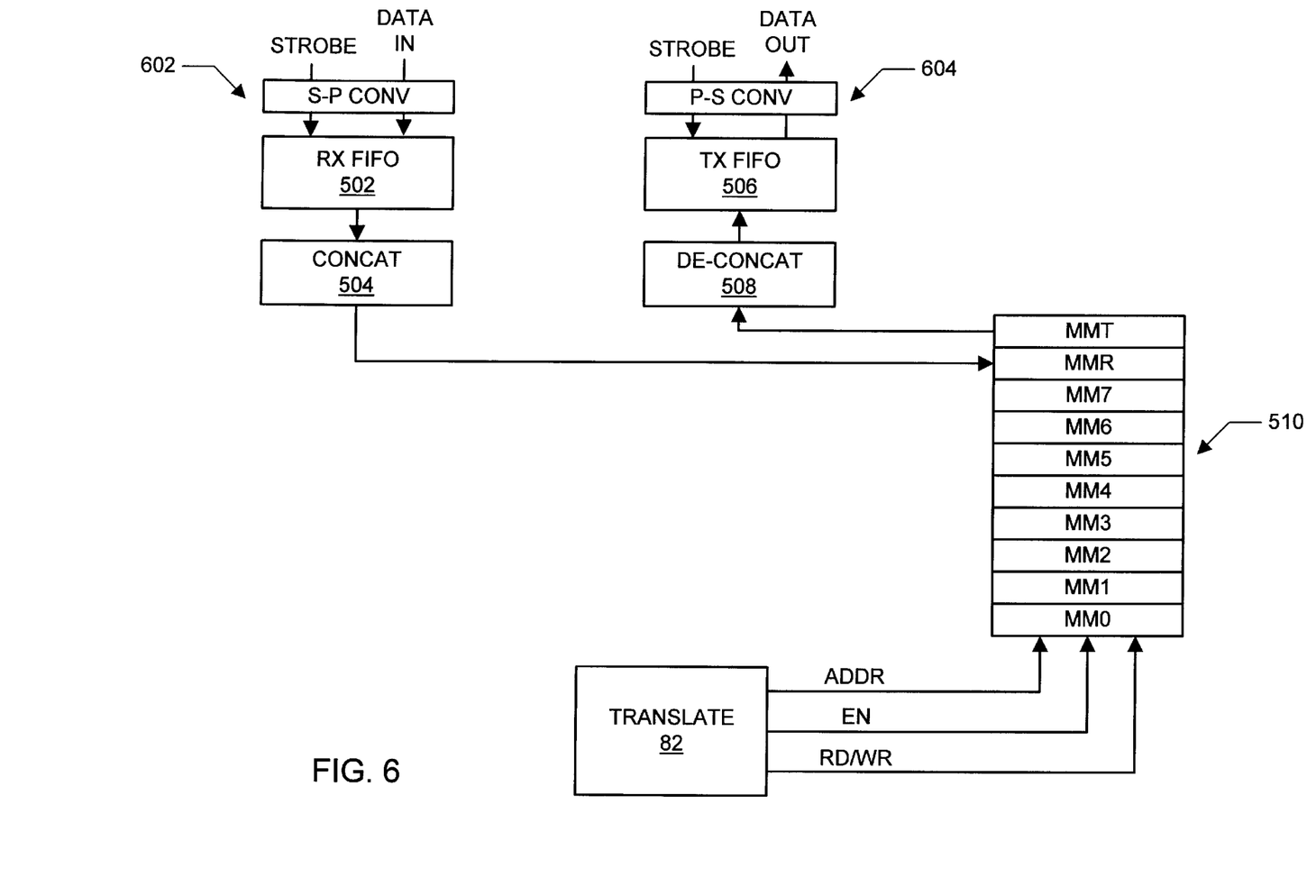
FIG. 6 is a block diagram of alternative embodiment of a translate unit and register storage device.

Turning now to FIG. 6, an alternative embodiment of register storage 84 is shown. Devices similar or identical to those in FIGS. 4 and 5 have the same reference numerals for convenience. Register storage 84 includes serial-to-parallel converter 602, receive buffer 502, concatenator 504, parallel to serial converter 604, transmit buffer 506, deconcatenator 508 and register file 510. In the embodiment illustrated in FIG. 6, a serial to parallel converter is coupled between receive buffer 502 and the receive bus from multimedia device 190. In this embodiment, data is transferred from multimedia device 190 to receive buffer 502 serially. In one embodiment, the serial data is received synchronously with a timing signal on a strobe input. In an alternative embodiment, the serial data is received asynchronously or isochronously. Serial-to-parallel converter 602 coverts the serial data received from the peripheral device to parallel data which is stored in receive buffer 502.

Parallel-to-serial converter 604 is coupled between transmit buffer 506 and a peripheral device. In the illustrated embodiment, data is transferred to the peripheral device via a data-out signal serially. In one embodiment, the serial data is synchronous with a timing, signal on a strobe input. In an alternative embodiment, the transmit data is output on the data output signal asynchronously or isochronously. Parallel-to-serial converter 604 converts parallel data received from transmit buffer 506 to serial data output on the data-out signal. In other respects, the embodiment illustrated in FIG. 6 operates in substantially the same manner as the embodiment illustrated in FIG. 5.

Figure 7:
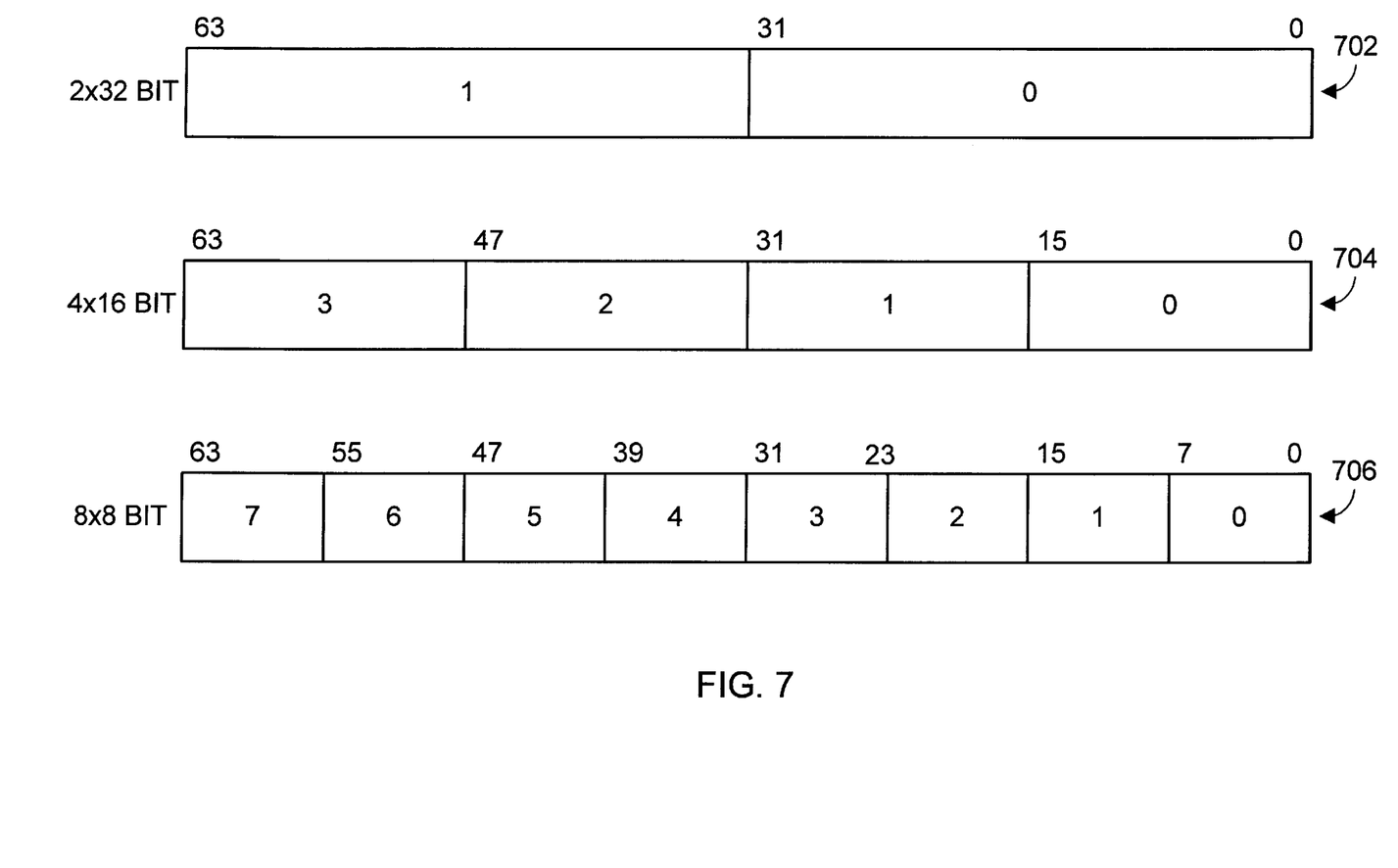
FIG. 7 is a diagram illustrating the packing and unpacking format according to one embodiment of the present invention.

Turning now to FIG. 7, the packing and unpacking format of concatenator 504 and de-concatenator 508 is shown according to one embodiment of the present invention. As discussed above, concatenator 504 joins or merges a plurality of data words stored in receive buffer 502 into one multimedia data word. In one embodiment, a multimedia data word is 64 bits. Accordingly, concatenator 504 combines a plurality of data words to produce a 64-bit data value. The number of data words concatenated to form the multimedia data value depends upon the width of the data words stored in received buffer 502. For example, if receive buffer 502 stores data words of 32 bits, concatenator 504 concatenates two data words to form the 64-bit multimedia data value. As illustrated in 702, a lower order 32-bit word is stored in bits 0–31 of the multimedia data word, and a higher order data word is stored in bits 32–63. Alternatively, if receive buffer 502 stores 16-bit data words, concatenator 504 concatenates four 16-bit data words to form one 64-bit multimedia data word. In another embodiment, concatenator 504 combines eight 8-bit data words from received buffer 502 to form a 64-bit multimedia data word.

De-concatenator 508 separates a 64-bit multimedia data word into a plurality of smaller data words for storage within transmit buffer 506. If transmit buffer 506 stores 32-bit data words, de-concatenator 508 separates a 64-bit multimedia data word into two 32-bit data words. Alternatively, if transmit buffer 506 stores 16-bit data words, de-concatenator 508 separates the 64-bit multimedia data word into four 16-bit data words. Still further, if transmit buffer 506 stores 8-bit data words, de-concatenator 508 separates the 64-bit multimedia data word into eight 8-bit data words.

What is claimed is:

1. A computer system comprising:
   a peripheral device including an data port configured to input transmit data and output receive data;
   a central processing unit coupled to said data port of said peripheral device wherein said central processing unit includes:
      a multimedia unit including:
         a receive buffer configured to input and store said receive data received from said peripheral device;
         a transmit buffer configured to store said transmit data to be transferred to said peripheral device;
         a register file coupled to said receive buffer and said transmit buffer, wherein said register file includes a receive register configured to receive data from said receive buffer, and a transmit register configured to transfer said transmit data to said transmit buffer.

2. The computer system of claim 1 further comprising a register mapping device configured to map register addresses to physical registers.

3. The computer system of claim 2 wherein said mapping device is configured to map an architected register address to said receive register.

4. The computer system of claim 2 wherein said mapping device is configured to map an architected register address to said transmit register.

5. The computer system of claim 1 further comprising a concatenator coupled between said receive buffer and said register file configured to concatenate data received from said peripheral device prior to transferring said data to said receive register.

6. The computer system of claim 5 further comprising a de-concatenator coupled between said transmit buffer and said register file configured to de-concatenate data from said transmit register prior to storing said data in said transmit buffer.

7. The computer system of claim 1 wherein said data port is configured to transmit and receive serial data to and from said central processing unit.

8. The computer system of claim 1 wherein said data port is configured to transmit and receive parallel data to and from said central processing unit.

9. The computer system of claim 1 wherein said receive buffer is configured to output a first signal indicative of an amount of data in said receive buffer.

10. The computer system of claim 9 wherein said central processing unit is configured to receive said first signal and to adjust a rate of data processing based on said first signal.

11. The computer system of claim 1 wherein said transmit buffer is configured to output a second signal indicative of the amount of data in said transmit buffer.

12. The computer system of claim 11 wherein said central processing unit configured to receive said second signal and to adjust a rate of data processing based on said second signal.

13. A computer system comprising:
   a peripheral device including an data port configured to input transmit data and to output receive data; and
   a multimedia unit including:
      a receive buffer configured to input and store said receive data received from said peripheral device;
      a concatenator coupled to said receive buffer and configured to concatenate said receive data;
      a transmit buffer configured to store said transmit data to be transferred to said peripheral device;
      a de-concatenator coupled to said transmit buffer and configured to de-concatenate said transmit data;
      a register file coupled to said receive buffer and said transmit buffer, wherein said register file includes a receive register configured to receive data from said receive buffer, and a transmit register configured to transfer data to said transmit buffer.

14. The computer system of claim 13 wherein said data port of said peripheral device is directly coupled to said receive buffer and said transmit buffer.

15. The computer system of claim 14 further comprising a register mapping device configured to map register addresses to physical registers.

16. The computer system of claim 13 wherein said receive buffer is configured to output a first signal indicative of an amount of data in said receive buffer.

17. The computer system of claim 16 wherein said central processing unit is configured to receive said first signal and to adjust a rate of data processing based on said first signal.

18. The computer system of claim 13 wherein said transmit buffer is configured to output a second signal indicative of the amount of data in said transmit buffer.

19. The computer system of claim 18 wherein said central processing unit is configured to receive said second signal and to adjust a rate of data processing based on said second signal.

* * * * *